Patented Feb. 12, 1952

2,585,506

UNITED STATES PATENT OFFICE 2,585,506

STABILIZATION OF HALOGEN-CONTAINING ORGANIC MATERIALS

Edward C. Shokal, Oakland, De Loss E. Winkler, Berkeley, and Paul A. Devlin, San Francisco, Calif., assignors to Shell Development Company, San Francisco, Calif., a corporation of Delaware No Drawing. Application June 21, 1948, Serial No. 34,346

2 Claims. (Cl. 260—30.4)

This invention relates to the stabilization of halogen-containing organic materials having a tendency to decompose with the release of hydrogen halide. More particularly, the invention provides a method of inhibiting the decomposition of halogen-containing organic materials by incorporating in them an additive which is a member of a unique class of stabilizing additives. The invention thus provides compositions in which volatile halogen-containing organic materials, characterized by their tendency to decompose during transportation or storage, are rendered resistant to decomposition by the co-presence of an additive which is readily removable, as well as compositions in which non-volatile halogen-containing organic materials, characterized by their tendency to darken and decompose when exposed to heat or light, are rendered resistant to decomposition by the co-presence of an additive having a volatility not appreciably greater than the material it stabilizes.

Halogen-containing organic materials have wide commercial application and value. The volatile monomeric compounds are extensively used in insecticidal compositions, soil fumigants, and flame proofing materials. The non-volatile high molecular weight or polymeric compounds are used in surface coatings for wood, metal, fabric, paper, in spinning, in films, in packaging materials, in synthetic rubbers and in solid molded articles.

Polyvinyl chloride is perhaps the best known halogen-containing polymer and its uses and properties are in many respects characteristic of the class. Polyvinyl chloride is for many applications too brittle and its softening temperature is too high for economical molding. It is therefore generally necessary to employ from 5% to 60% of a plasticizer with the polymer to improve its molding and shock resisting qualities.

The tendency of polyvinyl chloride, and the halogen-containing polymers generally, to be decomposed by heat and/or light is a serious disadvantage. At elevated temperatures the polymers tend to rapidly become darkened in color and to become increasingly brittle. The discoloration and/or decomposition is accompanied by the release of hydrogen halide which, in addition to corroding metal apparatus, catalyzes further decomposition of the polymer rendering it increasingly rapid.

Numerous additives have been proposed as stabilizers to reduce this decomposition which occurs not only when the polymer is exposed to the weather or strong light, but in many cases at the elevated temperatures required in the injection molding, calendering or extrusion processes necessary to form useful objects from the polymers. Basic inorganic compounds have proved to be advantageous in certain respects for this purpose. White lead, for example, is cheap, non-volatile and capable of neutralizing a large amount of hydrogen halide per unit weight. However, the inorganic stabilizers such as white lead render plastic compositions translucent and are in many cases poisonous. Numerous organic compounds have also been proposed, but the organic additives have in general lacked the efficiency and low cost of the inorganic compounds, and because their volatility is generally much greater than that of the materials to be stabilized, they soon evaporate from the compositions.

Of the volatile halogen-containing organic materials, the organic chlorides are probably the most widely used, and their properties and uses are in many respects characteristic of the class. Such materials, even when they are substantially water free, decompose and thereby release hydrogen chloride during shipment and storage, particularly when packaged in metal containers (which packaging, is highly preferable from the practical standpoint). This decomposition causes corrosion of metal containers and, whether it occurs in metal or glass, imparts a darkened color and a foul odor to the halogen-containing organic material.

A principal object of the present invention is therefore to provide a method of inhibiting the tendency of halogen-containing organic materials to decompose with the release of hydrogen halide without restricting the uses for which they are applicable. Another object is to provide stabilized compositions in which volatile halogen-containing organic materials, characterized by their tendency to release hydrogen halide, exhibit a greatly increased resistance to discoloration and decomposition and from which compositions the volatile halogen-containing organic materials are readily separable, as well as providing compositions in which non-volatile halogen-containing organic materials, characterized by their tendency to release hydrogen halide, are rendered more resistant to such decomposition while having essentially the same transparency as the pure halogen-containing organic material, by the presence of a stabilizing material having substantially no tendency to evaporate from the composition. A further object is to provide stabilized halogen-containing polymer compositions in which a highly compatible additive is incorporated in amounts whereby it functions as a plasticizer as well as an inhibitor of the hydrogen halide releasing decomposition of the polymer. Still other objects and advantages will be apparent from the following description of the invention.

We have now discovered that the incorporation of a certain class of polymeric materials, which are more fully described below, into halogen-containing organic materials accomplishes the above and other objects of the invention. This class of substances is the polymers of an epoxyalkyl alkenyl ether, which polymeric ethers contain at least three epoxide groups per molecule.

The polymers are formed by polymerizing, under conditions causing the polymerization of aliphatic carbon-to-carbon multiple bonds of the expoxyalkyl alkenyl ethers. The polymeric ethers contain at least 3 monomer units, at least 3 epoxide groups and have an epoxide value of at least 20% of the theoretically possible value.

Compounds containing epoxide groups are capable of undergoing polymerization reactions involving the opening of the epoxy ring and the formation of polyethers, polyacids, polyesters and the like at elevated temperatures in the presence of acids or bases. Polymerization conditions suitable for the formation of the polymeric ethers are therefore a substantial absence of alkaline or acidic catalysts, and the presence of oxygen, peroxy compounds, actinic light and the like catalysts or reaction initiators.

Illustrative examples of the class include the following polymers prepared in the manner defined above: poly(allyl 2,3-epoxypropyl ether); allyl 2,3-epoxypropyl ether-styrene copolymer; methallyl 3,4-epoxybutyl ether-allyl benzoate copolymer; poly(vinyl 2,3-epoxypropyl ether); allyl glycidyl ether-vinyl acetate copolymer; poly(methallyl 2,3-epoxypropyl ether); poly(allyl 1-methyl-2,3-epoxypropyl ether); poly(4-glycidyloxy-styrene; poly(1-methylidenebutyl 2,3-epoxypropyl ether); poly(tiglyl 3,4-epoxybutyl ether); and the like.

The polymeric ethers are prepared from monomers in which the epoxide groups are contained in the molecules of epoxyalkyl alkenyl ethers such as those containing not more than 10 carbon atoms, and a particularly preferred subclass of such polymers are derived from monomers in which the epoxide groups are contained in the molecules of epoxyalkyl alkenyl ethers containing a terminal methylene group and two adjacent carbon atoms linked by the epoxy group, e. g., compounds such as the vinyl or allyl glycidyl ethers.

Illustrative examples of a preferred class include the following polymers prepared in the defined manner: poly(allyl glycidyl ether); allyl glycidyl ether-styrene copolymer; poly(vinyl glycidyl ether); vinyl glycidyl ether-vinyl acetate copolymer; poly(crotyl 2,3-epoxybutyl ether); poly(2-allyloxy-1,3-epoxypropane); poly(1-vinyloxy-2-methyl-2,3-epoxypropane); poly(tertiary-butenyl glycidyl ether); and poly(1,1-dimethyl-2-octenyl glycidyl ether). Still other examples will be found among the polymers and copolymers described and claimed in the copending application of Evans and Shokal, Serial No. 1,894, filed January 12, 1948.

Liquid polymers obtained from allyl glycidyl ether (1-allyloxy-2,3-epoxypropane) and from mixtures of allyl glycidyl ether with styrene have been found to be especially suitable in preparing stable compositions of either volatile or non-volatile halogen-containing organic materials. Such polymers are soluble in the common liquid organic solvents and thus are soluble in the monomeric halogen-containing materials that are miscible with similar solvents. The polyepoxypolymethylenes obtained by the homopolymerization of allyl glycidyl ether have high epoxide values and are extremely efficient stabilizers for applications in which a small amount of stabilizer is desirable. The polyepoxypolymethylenes obtained from the polymerization of mixtures of alkenyl epoxyalkyl ethers with monomers containing a similar olefinic polymerizable group, for example, allyl glycidyl ether-styrene mixtures, inherently have a lower epoxide value and are somewhat less efficient in small amounts (the efficiency is not, however, a direct function of the epoxide value), but such polymers can be produced in quantity at a comparatively low cost, and are particularly effective in applications in which a large amount of the stabilizer (a stabilizer which is a plasticizer as well) is desired.

The following examples illustrate in detail one suitable method of preparing the polymeric ethers. The examples are applied to the particular case of preparing the particularly preferred additives, but, by modifications which will be readily apparent to those skilled in the art, the method of synthesis may be adapted to the use of any of the monomers falling within the scope of the invention.

*Example I.—Polymerization of allyl glycidyl ether*

Allyl glycidyl ether was refluxed at 155° C. while a stream of air was introduced below the surface of the liquid. The refluxing and aeration was intermittent, and the refractive index of the solution rose from $n_D^{20}$ 1.4345 to $n_D^{20}$ 1.4764 corresponding to about 50% conversion to a pale yellow liquid polymer. The polymer was found to have an epoxide value of 0.5 equivalent per 100 grams. Since the epoxide value of a poly(allyl glycidyl ether) composed solely of polymethylene molecules in which a hydrogen atom of each alternate methylene group is replaced by a glycidyloxymethyl radical would be 0.88 equivalent per 100 grams, the polymer prepared by air-blowing allyl glycidyl ether had 57% of the theoretically obtainable epoxide value.

*Example II.—Preparation of an allyl glycidyl ether-styrene copolymer*

To 90 parts of allyl glycidyl ether, heated at reflux temperature (150–155° C.) and catalyzed by a stream of dry air bubbles, was added 10 parts of styrene in 10 equal portions one hour apart. After refluxing an additional 2 hours the volatiles were removed by vacuum distillation to give 20% of a clear light yellow viscous copolymer. On analysis the polymer was shown to contain 42% by weight of styrene groups. It had an epoxide value of 0.44 equivalent per 100 grams.

The process of the invention is applicable to non-volatile halogen-containing high molecular weight organic materials such as the halogen-containing polymers including the vinyl halide resins, such as polyvinyl chloride, polyvinylidene bromide, polyfluorochloroethylene, vinyl chloride, and vinylidene chloride copolymers; copolymers of vinyl halides with other unsaturates such as vinyl chloride with vinyl acetate, vinylidene bromide with vinyl acetate, and ethylene with vinyl chloroacetate; further halogenated vinyl halide polymers; halogenated high molecular weight natural resins and hydrocarbons such as the commercially available halogenated paraffin waxes, the halogenated natural rubbers, and the like.

In addition, the process of the invention is well adapted to the stabilization of volatile liquid halogen-containing materials. In this application the present process has a particular advantage in that the polymeric ethers are substantially non-volatile and the stabilized materials may be readily separated from them by simple distillation. In general, stabilized compositions may be prepared from any volatile halogen containing material which is miscible with the common organic solvents. Illustrative examples of volatile halogen containing organic materials which may be so stabilized include 2-chloro-2-butene, trichloropropane, trichloropropene, 1,3-dibromopropane, 2-bromo-2-butene, allyl chloride, methallyl chloride, isocrotyl chloride, and the like.

In accordance with the invention, stabilized halogen-containing organic compositions are produced by the incorporation of an effective amount of the polymeric ethers into the material to be stabilized. In the stabilization of polymers a particularly convenient procedure comprises premixing the stabilizer, plasticizer and other compounding ingredients with the dry polymer and completing the blending in a Banbury mixer or on hot rolls. In the case of the volatile halogen-containing materials, the polymeric ether is simply dissolved if the material is liquid, or if a normally gaseous material is to be stabilized the gas is dissolved in the polymeric ether or in a mutual solvent in which it is contained. In general, any of the commonly employed methods of incorporating ingredients into polymers or liquids may suitably be used in conducting the process of the invention.

The polymeric ether may be employed in amounts of up to about 30% by weight or more based on the weight of polymer in compositions of halogen-containing polymers which have physical properties similar to those of the vinyl resins as typified by polyvinyl chloride. In volatile halogen-containing organic material compositions, substantially any amount of the polymeric ether may be employed, although little advantage will be obtained by the employment of more than about 10% based on the weight of the material to be stabilized. In general, as a stabilizer, amounts of from 0.1% to 10% are preferred, and amounts of from 2% to 5% are particularly suitable in a non-volatile halogen-containing organic material composition while amounts of from 0.3% to 1% are preferred in similar compositions of volatile materials. Where the polymeric ether is to function as a plasticizer as well as a stabilizer in a non-volatile halogen-containing organic material composition, it is preferably employed in amounts of from 5% to 30% based on the weight of the polymer. Where greater plasticizing is desirable, the polymeric ethers are preferably employed in conjunction with the commonly employed plasticizers such as dibutyl phthalate, dibutyl phosphite, tricresyl phosphate, dioctyl phthalate and methoxyethyl acetyl ricinoleate.

The following example illustrates the comparability of the physical properties of (A) a halogen-containing polymer composition in which 30% of a polymeric ether is employed in conjunction with a like amount of one of the plasticizers commonly employed in vinyl resins with (B) the physical properties of the same polymer plasticized solely with the commonly employed plasticizer. Composition (A) of the example illustrates a particularly preferred stabilized non-volatile halogen-containing organic composition and a method for its preparation.

*Example III.—Polyvinyl chloride plasticized as well as stabilized*

Molded compositions prepared from the recipe, 100 parts polyvinyl chloride and 60 parts of plasticizer, were compared. In one case, (A), the plasticizer was dioctyl phthalate only and in the other, (B), one-half of the dioctyl phthalate was replaced by an equal amount of a liquid poly-(allyl glycidyl ether).

|  | A | B |
|---|---|---|
| Tensile strength (pounds/square inch) | 2,300 | 2,650 |
| Per cent elongation at break | 375 | 360 |
| 100% modulus (pounds/square inch) | 850 | 1,710 |
| Brittle point (degrees centigrade) | −38 | −45 |
| Stiffness (pounds/square inch) | 840 | 650 |

Where it is desirable, additional stabilizing materials may be used with the polymeric ethers. In the case of stabilized polymer compositions, the compositions may, in addition to the polymeric ethers, contain additional stabilizing materials such as basic lead carbonate, and the various stabilizing agents commonly used with such polymers.

The following examples illustrate the application of the invention to the stabilization of particular halogen-containing organic materials. The examples also illustrate by comparison the stability obtained under identical conditions by the use of the polymeric ethers in halogen-containing materials with that obtained by the use of other stabilizers in the same materials.

As many variations in particular materials employed as well as their proportions are within its scope, the invention is not limited to the compounds and recipes recited in any of the examples. In each of the examples the proportions are expressed in parts by weight.

*Example IV.—Comparative stability of polyvinyl chloride compositions*

Four polyvinyl chloride compositions were prepared according to the following recipe:

| | Parts |
|---|---|
| Polyvinyl chloride | 100 |
| Dioctyl phthalate | 50 |
| Stabilizer | 2 | and a fifth containing 5 parts of poly(allyl glycidyl ether) as the stabilizer.

Standard batches were prepared consisting of 465 grams of resin plasticizer and stabilizer, and were milled for 15 minutes at roll temperatures of 285° C.

| Stabilizer | Control | | Oven at 160° C. | | | | Oven at 100° C. | | | |
|---|---|---|---|---|---|---|---|---|---|---|
| | | | 1 hour | | 3 hours | | 7 days | | 14 days | |
| | E. C. | Stiff | E. C. | Stiff | E. C. | Stiff | E. C. | Stiff | E. C. | Stiff |
| Basic lead silicate | TD | 1,660 | TD | 2,400 | TD | 33,000 | TD | 1,560 | TD | 1,740 |
| Glycidyl oleate | 0.8 | 1,400 | 6.3 | 4,700 | TD | 11,900 | 3.0 | 1,860 | 7.5 | 1,750 |
| Poly (allyl glycidyl ether) 2 parts | 0.5 | 1,450 | 3.4 | 2,700 | 8.9 | 15,900 | 0.6 | 1,740 | 0.9 | 2,200 |
| Poly (allyl glycidyl ether) 5 parts | 0.7 | 1,140 | 0.8 | 1,780 | 1.9 | 7,280 | 0.8 | 1,380 | 1.2 | 2,200 |

E. C.—extinction coefficient when light used has a wave length of 5,000 A.
TD—samples were too dark or too opaque to determine E. C.
Stiff—stiffness in flexure, pounds per square inch.

The basic lead silicate, glycidyl oleate are commercially available stabilizers for halogen-containing polymers.

The poly(allyl glycidyl ether) employed was a liquid polymer having an average molecular weight of about 600 and an epoxide value of 0.63 equivalent per 100 grams or 71% of the theoretically possible epoxide value.

The poly(allyl glycidyl ether) containing compositions illustrate particularly preferred stabilized polyvinyl chloride compositions.

*Example V.—Comparative stability of chlorinated natural rubber compositions*

Two identical steel panels were coated with chlorinated natural rubber compositions prepared according to the following recipe:

| | Parts |
|---|---|
| Chlorinated rubber | 100 |
| Dibutyl phthalate | 15 |
| Stabilizer | 5 |

The chlorinated rubber employed is a commercially available product in the form of a white powder having a viscosity of 20 centipoises at 25° C. as a 20% solution in toluene. The panels were coated by dissolving the above ingredients in a solvent and dipping the panels. A third panel was coated in the same manner except that no stabilizer was employed. One coating composition contained a commercially available strontium compound recommended for use with halogen-containing polymers and the second contained a poly(allyl glycidyl ether) similar to that employed in Example IV.

The panels were heated in an oven at 160° C. and compared at intervals of 0.5, 1.0 and 2.0 hours.

At 0.5 hour the panel coating containing no stabilizer was darkened over the entire surface. The panel coating containing the strontium compound showed darkened areas while the panel coating containing poly(allyl glycidyl ether) showed no change.

At 1.0 hour the panel containing the strontium compound was darkened over its whole area while the coating containing poly(allyl glycidyl ether) still showed no change.

At 2.0 hours the coating containing poly(allyl glycidyl ether) was darkened in areas amounting to less than a third of its area.

The poly(allyl glycidyl ether) containing composition illustrates a particularly preferred stabilized chlorinated natural rubber composition.

*Example VI.—The effects of a polymeric glycidyl ether in a copolymer comprising a halogen-containing polymer*

A copolymer of polyvinyl chloride and polyvinyl acetate containing about 95% of vinyl chloride was plasticized with 50 parts per hundred parts of resin of dioctyl phthalate. Two samples were milled for 15 minutes at roll temperatures of 285° F. One sample contained only the above ingredients and the other contained 2 parts per hundred parts of resin of a stabilizer comprising a liquid poly(allyl glycidyl ether) having an epoxide value of 71% of the theoretically possible epoxide value. The two samples were subjected to the following tests and the extinction coefficient and stiffness of each sample was measured before testing and after each test.

| | Unstabilized | | Stabilized | |
|---|---|---|---|---|
| | E. C. | Stiff | E. C. | Stiff |
| In air: | | | | |
| 1. Control (prior to any tests) | 0.88 | 1,640 | 0.75 | 1,330 |
| 2. 0.5 hour at 160° C | 3.12 | 1,620 | 0.99 | 1,740 |
| 3. 1.0 hour at 160° C | 5.40 | 2,230 | 1.28 | 2,500 |
| 4. 1.5 hours at 160° C | 7.49 | 3,900 | 1.61 | 4,150 |
| 5. 2.0 hours at 160° C | 8.56 | 6,800 | 2.42 | 9,400 |
| 6. 3.0 hours at 160° C | TD | 17,000 | 4.04 | 29,500 |
| 7. 1 week at 100° C | 7.33 | 1,170 | 1.46 | 1,260 |
| 8. 2 weeks at 100° C | TD | 1,830 | 7.80 | 1,980 |
| In a weatherometer at 100° C: | | | | |
| 9. 170 hours | [1] 1.17 | 1,430 | 1.00 | 1,350 |
| 10. 340 hours | [1] 2.20 | 1,200 | 1.40 | 1,360 |
| In a mold (absence of air): | | | | |
| 11. 1 min. at 170° C | 0.97 | 1,600 | 0.67 | 1,440 |
| 12. 10 min. at 170° C | 5.99 | 1,700 | 1.55 | 1,460 |
| 13. 20 min. at 170° C | 10.11 | 1,680 | 1.73 | 1,480 |
| 14. 30 min. at 170° C | >10.64 | 1,660 | 1.28 | 1,770 |

[1] The surface of the unstabilized composition was pitted in the weatherometer tests while the surface of the stabilized composition remained unaffected. For the above tests samples 1 inch by 1½ inches by 0.075 inch were cut from a tensile sheet which had been molded 2 minutes at 160° C.; after oven exposure the samples were repressed at 160° C. before determining the extinction coefficient and stiffness.

The poly(allyl glycidyl ether) containing composition illustrates a particularly preferred stabilized copolymer composition.

*Example VII.—The effects of a polymeric glycidyl ether in a chlorinated paraffin wax*

Two samples of a solid chlorinated paraffin wax having a melting point of about 90–100° C. by the ring and ball method, a chlorine content of about 70% and a molecular weight of approximately 1060 were employed. The chlorowax is a commercially available product recommended as an ingredient of paints, textile coatings, lacquers, glues and adhesives, printing inks, paper coatings and varnishes. The samples consisted of 10 grams of the chlorowax in small beakers, to one of them ½ gram or 5 parts by weight of a liquid poly(allyl glycidyl ether) having an epoxide value of 71% of the theoretically possible value was added.

The two beakers were heated at 180° C. and comparisons of the color of the chlorowax were made at intervals of 1, 2 and 3 hours, by allowing the samples to cool and observing the solid chlorowax by looking through it towards a strong light source. When initially melted and cooled the chlorowax is a light amber colored clear solid.

After one hour the unstabilized chlorowax was considerably darkened while the stabilized sample was unchanged.

After two hours the unstabilized sample had taken on a dark greyish cast and became nearly opaque while the stabilized sample was but slightly darkened.

After three hours the unstabilized sample was extremely dark in color and entirely cut off the light when held in front of the source, while the stabilized sample although darkened transmitted a clear bright image of the light source when held before it.

The poly(allyl glycidyl ether) containing composition illustrates a particularly preferred stabilized halogenated paraffin wax composition.

*Example VIII.*—*The effects of a polymeric glycidyl ether which is a copolymer in a halogen-containing polymer composition*

A polyvinyl chloride resin was plasticized with 50 parts per hundred parts of resin of dioctyl phthalate. Two samples were milled for 15 minutes at roll temperature of 285° F. One sample contained only the above ingredients and the other contained 2 parts per hundred parts of resin of a stabilizer comprising a copolymer of allyl glycidyl ether with styrene having an epoxide value of 20% of the theoretically possible value. The two samples were subjected to the following tests and the extinction coefficient and stiffness of each sample was measured before testing and after each test.

| | Unstabilized | | Stabilized | |
|---|---|---|---|---|
| | E. C. | Stiff | E. C. | Stiff |
| In air: | | | | |
| 1. Controls (prior to any tests) | 0.9 | 1,570 | 0.6 | 1,780 |
| 2. 0.5 hour at 160° C | 2.9 | 1,940 | 0.9 | 2,300 |
| 3. 1.0 hour at 160° C | 5.6 | 2,600 | 1.5 | 3,600 |
| 4. 1.5 hours at 160° C | 7.3 | 3,730 | 2.4 | 6,900 |
| 5. 2.0 hours at 160° C | 8.9 | 7,200 | 3.6 | 10,500 |
| 6. 3.0 hours at 160° C | TD | 28,200 | 7.5 | 34,100 |
| 7. 1 week at 100° C | 3.3 | 2,130 | 1.5 | 1,630 |
| 8. 2 weeks at 100° C | 3.4 | 2,650 | 9.7 | 2,450 |
| In a weatherometer: | | | | |
| 9. 170 hours | 0.8 | 1,370 | 0.5 | 1,450 |
| 10. 340 hours | 1.1 | 1,470 | 0.6 | 1,470 |
| In a mold in absence of air: | | | | |
| 11. 1 minute at 170° C | 0.7 | 1,630 | 0.6 | 1,830 |
| 12. 10 minutes at 170° C | 4.7 | 1,640 | 1.8 | 1,920 |
| 13. 20 minutes at 170° C | 7.5 | 1,650 | 4.7 | 2,000 |
| 14. 30 minutes at 170° C | 9.1 | 1,600 | 6.4 | 1,910 |

*Example IX.*—*Stabilization of organic chlorides with polymeric ethers*

The monomers used for the stabilization tests were shipping samples which were Claisen distilled immediately before the tests were started. The color of the stabilized and unstabilized monomers were observed after the stated periods. The letter C indicates that the sample was colorless, and the numbers are the Gardner colors of colored samples.

| Days Aged | Allyl Chloride | | | | Methallyl Chloride | | | | Isocrotyl Chloride | | | | Remarks |
|---|---|---|---|---|---|---|---|---|---|---|---|---|---|
| | A1 | A2 | A3 | A4 | B1 | B2 | B3 | B4 | C1 | C2 | C3 | C4 | |
| 0 | C | C | C | C | C | C | C | C | C | C | C | C | C3 and C4 were cloudy. |
| 3 | C | C | C | C | | | | | C | 4 | C | C | |
| 4 | | | | | C | C | C | C | | | | | |
| 7 | C | 1-2 | C | C | | | | | C | 7-8 | C | <1 | C4 was cloudy and contained a small amount of precip. |
| 8 | | | | | C | 3-4 | C | C | | | | | |
| 11 | C | 4-5 | C | C | | | | | C | 10 | <1 | 1-2 | C3 contained a small amount of precip. |
| 12 | | | | | C | 7-8 | C | C | | | | | |
| 14 | C | 5 | C | C | | | | | C | 11 | <1 | 1-2 | |
| 15 | | | | | C | 7-8 | C | C | | | | | |
| 24 | C | 6-7 | C | C | | | | | C | 12 | <1 | 2-3 | |
| 25 | | | | | C | 7 | C | C | | | | | |

A1, B1, C1=monomers stored alone in glass bottles.
A2, B2, C2=monomers stored in bottles with a strip of drum metal.
A3, B3, C3=monomers containing 0.5% poly(allyl glycidyl ether) (epoxy value 0.67 eq. per 100 g.) stored in bottles with a strip of drum metal in each bottle.
A4, B4, C4=monomers containing 0.5% allyl glycidyl ether-styrene copolymer (epoxy value 0.44 eq. per 100 g.) stored in bottles with a strip of drum metal in each bottle.

The invention claimed is:

1. A composition of matter comprising a high molecular weight halogenated hydrocarbon in admixture with from about 2 to 5%, based on the weight of halogenated hydrocarbon, of liquid polymer of allyl glycidyl ether, which polymer contains at least three epoxide groups per molecule.

2. A composition of matter comprising polyvinyl chloride in admixture with from about 2 to 5%, based on the weight of polyvinyl chloride, of liquid polymer of allyl glycidyl ether, which polymer contains at least three epoxide groups per molecule.

EDWARD C. SHOKAL.
DE LOSS E. WINKLER.
PAUL A. DEVLIN.

REFERENCES CITED

The following references are of record in the file of this patent:

UNITED STATES PATENTS

| Number | Name | Date |
|---|---|---|
| 2,160,943 | Britton et al. | June 6, 1939 |
| 2,166,604 | Meyer | July 18, 1939 |
| 2,400,333 | Bent et al. | May 14, 1946 |
| 2,450,234 | Evans et al. | Sept. 28, 1948 |
| 2,457,300 | Boese | Dec. 28, 1948 |
| 2,464,753 | Shokal et al. | Mar. 15, 1949 |
| 2,470,324 | Staudinger et al. | May 17, 1949 |
| 2,476,922 | Shokal et al. | July 19, 1949 |
| 2,512,996 | Bixler | June 27, 1950 |
| 2,524,432 | Dorough | Oct. 3, 1950 |
| 2,538,072 | Zech | Jan. 16, 1951 |